United States Patent Office 3,705,880
Patented Dec. 12, 1972

3,705,880
PROCESS FOR THE PREPARATION OF ALKYLENE OXIDE COPOLYMERS
Toshiaki Matsuo, Yokohama, Koji Chono, Kawasaki, Tadahiro Go, Yokohama, and Hirotaka Komai, Kamakura, Japan, assignors to The Japanese Geon Company Ltd., Tokyo, Japan
Filed Dec. 23, 1970, Ser. No. 101,002
Claims priority, application Japan, Dec. 27, 1969, 45/104,820
Int. Cl. C08g 22/00
U.S. Cl. 260—77.5 R      11 Claims

ABSTRACT OF THE DISCLOSURE

A process for the preparation of alkylene oxide-isocyanate copolymers, which comprises polymerizing an alkylene oxide in the presence of at least one isocyanate compound, with the action of a catalyst formed of at least one compound containing a phosphorus-oxygen linkage and at least one compound of a metal of Group III and IV of the Periodic Table.

---

This invention relates to a process for the preparation of alkylene oxide copolymers. More particularly, the invention relates to a process for the preparation of novel alkylene oxide-isocyanate copolymers, using a novel catalyst system.

The only literature we know of in the art of copolymerization of an alkylene oxide with an isocyanate is the report of Furukawa et al., on the preparation of a resinous ethylene oxide-isocyanate alternate copolymer, by the action of a triethylaluminum-water catalyst system (Japanese Official Patent Gazette, Publication No. 13,057/68 and Makromol. Chem., 85, 80 (1965)). The report teaches that, in the produced alternate copolymer, the copolymerized portion is water-insoluble, and its water-soluble portion contains none of the copolymer but the homopolymer of the alkylene oxide alone.

The object of this invention is to provide industrially useful, novel, alkylene oxide-isocyanate copolymers, exploring this undeveloped field. Still other objects and advantages of the invention will become apparent from the following description.

The alkylene oxide-isocyanate copolymers meeting the objects of this invention are prepared by the polymerization of an alkylene oxide in the presence of at least one isocyanate compound, using a catalyst formed of at least one compound containing a phosphorus-oxygen linkage and at least one compound of a metal of Group III or IV of the Periodic Table.

Characteristically, the alkylene oxide isocyanate copolymers formed in accordance with the subject process as above are water-soluble at large. Taking an example of the ethylene oxide-phenyl isocyanate copolymer produced in Run No. 2 of later appearing Example 1, more than approximately 95% by weight thereof is water-soluble, and the water-soluble portion does contain the copolymerized product, as demonstrated by the attached FIG. 1 (infrared absorption curve). As can be understood from FIG. 1, the infrared absorption curve of the sample obtained through polymerization of ethylene oxide in the system containing no phenyl isocyanate (Run No. 3 of Example 1) corresponds exactly to that of the water-soluble portion of ethylene oxide-phenyl isocyanate copolymer disclosed in the specified volume of Makromol. Chem. This proves that the copolymers prepared in accordance with the subject process are random copolymers, markedly differing from the water-soluble portion of the alternate copolymer taught by the prior art. Also the subject process has an advantage that, because the alkylene oxide and isocyanate can be randomly copolymerized, rubbery alkylene oxide-isocyanate copolymers can be formed in addition to resinous copolymers. It is furthermore possible to notably raise the degree of polymerization by copolymerizing a minor amount of isocyanate with the alkylene oxide. In certain types of polymerization systems, both the degree and rate of the polymerization can be increased by such means. Thus the subject process does possess a number of advantageous aspects. For example, by the concurrent presence of only a minor amount of isocyanate, e.g., 0.1–0.5 part by weight per 100 parts of alkylene oxide, the degree of polymerization is increased by 3 to 10 times, or even greater, and the rate of polymerization also is increased.

Examples of the phosphorus compounds containing an intramolecular phosphorus-oxygen linkage (P—O), which are used as a catalytic component in accordance with the invention, include: phosphoric acid compounds such as hypophosphorous acid ($H_3PO_2$), phosphorous acid ($H_3PO_3$), pyrophosphorous acid ($H_4P_2O_5$), hypophosphoric acid ($H_4P_2O_6$), phosphoric acid ($H_3PO_4$), pyrophosphoric acid ($H_4P_2O_7$), metaphosphoric acid (($HPO_3)_n$) and peroxophosphoric acid ($H_3PO_5$); organic esters of the above phosphoric acid compounds such as dimethyl phosphate, trimethyl phosphate, triethyl phosphate, tributyl phosphate, triphenyl phosphate, tricresyl phosphate, and triethyl phosphite; and inorganic salts of above phosphoric acid compounds such as sodium phosphate, ammonium phosphate, and amidophosphoric acid ($H_2PO_3NH_2$), etc. Also oxidized phosphorus compounds such as diphosphorus trioxide ($P_2O_3$) and diphosphorus pentoxide ($P_2O_5$); and oxyhalides of phosphorus compounds such as phosphoryl chloride ($POCl_3$), phosphoryl bromide ($POBr_3$), phosphoryl fluoride ($POF_3$), etc.; can be used as the phosphorus compounds containing the phosphorus-oxygen linkage.

As the compounds of metals of Group III or IV of the Periodic Table to be used as the other catalytic component in accordance with the invention, for example, the following may be named: compounds of boron, aluminum, gallium, tantalum, titanium, zirconium, tin, and lead. The metallic compounds include inorganic metal salts, organic metal salts, and organometallic compounds, etc. Preferred metallic compounds include trialkyl boron, zirconium halogenide, tin halogenide, titanium tetrachloride, titanium alkoxide, alkylaluminum compounds, aluminum alkoxide, aluminum halogenide, alkyltin compounds, organotin carboxylate, and alkyllead, etc. More specific examples of zirconium, tin, and aluminum compounds are as follows: tetraalkylzirconium, zirconium oxyhalide, zirconium tetrachloride, tetraalkyltin compounds alkyltin halide compounds, alkyltin oxide compounds, alkyltin hydroxide compounds, alkyltin sulfide compounds, alkylalkoxytin compounds, organotin-carboxylic acid derivatives, organotin hydrides, trialkylaluminum compounds, tricycloalkylaluminum compounds, triarylaluminum compounds, dialkylaluminum halides, monoalkylaluminum dihalides, dialkylaluminum alkoxides, etc.

The catalyst system employed in this invention is formed of a phosphorus compound containing an intramolecular phosphorus-oxygen linkage and a compound of a metal of Group III or IV of the Periodic Table, and may be prepared by mixing the two components in a suitable solvent, and heating the mixture if necessary to cause their reaction. Specific methods of the catalyst preparation is described in the later-given examples. Normally the catalyst is obtained by mixing and reacting one member each of the phosphorus compounds and Group III or IV metallic compounds and Group III or IV metallic compounds, while it is of course permissible to use plural types of either or both of the catalytic components. For example, an organoaluminum compound or titanium alkoxide may further be added to a phosphoric acid compound and alkyltin compound. With such combinations, catalysts of still higher polymerization activity can be obtained. When phosphorus oxychloride is used as the phosphoric compound, catalysts of higher activities can be obtained by the addition of alcohols, etc.

In short, the catalyst system meeting the purpose of this invention comprises, as the essential components, at least one phosphorus compound containing a phosphorus-oxygen linkage, and at least one compound of a metal of Group III or IV of the Periodic Table. Also single phosphorus compounds containing both a metal of Group III or IV and the phosphorus-oxygen linkage, such as tin oxyphosphate ($Sn_2O(PO_4)_2 \cdot 10H_2O$), titanium phosphate, aluminum phosphate, zirconium phosphate, etc., are also included within the scope of the catalysts useful for the invention.

Examples of alkylene oxides polymerizable in the presence of isocyanate compound in accordance with the subject process include ethylene oxide, propylene oxide, butene oxide, iobutylene oxide, epichlorohydrin, epibromohydrin, trifluoromethylethylene oxide, cyclohexene oxide, methylglycidyl ether, phenylglycidyl ether, butadiene monoxide, allylglycidyl ether, and styrene oxide, etc. More than one type of those alkylene oxides may be used as a mixture.

The isocyanate compounds to be employed in the invention include monoisocyanates such as phenyl isocyanate, parachlorophenyl isocyanate, orthochlorophenyl isocyanate, metachlorophenyl isocyanate, methyl isocyanate, ethyl isocyanate, n-propyl isocyanate, n-butyl isocyanate, etc.; diisocyanates such as 2,4-tolylene diisocyanate, 2,6-tolylene diisocyanate, metaxylene diisocyanate, 1,5-naphthalene diisocyanate, 4,4'-diphenylmethane diisocyanate, pyrene diisocyanate, nitrodiphenyl diisocyanate, diphenylsulfone diisocyanate, hexamethylene diisocyanate, etc.; and polyisocyanates such as the trimer of tolylene diisocyanate, condensation product of 4,4'-diphenylmethane diisocyanate, etc. That is, any compound containing at least one —NCO radical, or mixtures of such compounds, can be used as the copolymerizable component with the alkylene oxide.

In the copolymerization of the alkylene oxide with isocyanate compound by the action of polymerization catalyst in accordance with the invention, the quantity of the isocyanate compound is not critical. Normally, however, 0.1–1,000 parts by weight, preferably 0.1–2.0 parts by weight, of the compound is used per 100 parts by weight of alkylene oxide. Presence of only a trace of isocyanate compound in the polymerization system can cause the rise in degree of polymerization characteristic to the copolymerization process of this invention, and a copolymer markedly differing from an alkylene oxide homopolymer can be obtained. Also with certain types of the polymerization systems, copolymerization of a trace of isocyanate compound can cause an increase in the polymerization rate, as well as in the degree of polymerization.

The isocyanate compound may be present in the system together with the polymerization catalyst and alkylene oxide before initiation of the polymerization, or may be added during the polymerization. It is quite clear from nitrogen analysis and infrared absorption spectrum of the product polymer as well as from gelatin of the diisocyanate-alkylene oxide copolymer, that the isocyanate compound and alkylene oxide are randomly copolymerized.

Suitable solvents may be used at the time of copolymerization, or, if desired, the copolymerization may be advanced in the absence of any solvent. As the useful polymerization solvents, inert solvents such as diethyl ether, benzene, toluene, xylene, chlorobenzene, n-hexane, n-heptane, cyclohexane, carbon tetrachloride, etc., may be named.

The copolymerization of the invention satisfactorily progresses within a broad temperature range, i.e., −20–200° C., but is normally performed at 0–100° C.

When the alkylene oxide-diisocyanate copolymer is formed in accordance with the invention, occasionally one of the two isocyanate radicals of the diisocyanate compound remains intact, neither reacting with the alkylene oxide nor with the other diisocyanate. This can be confirmed by the di-n-butylamine-hydrochloric acid method (the method of determining isocyanate concentration, which comprises adding to the copolymer a benzene solution of di-n-butylamine which is weighed in advance to be excessive to the isocyanate radicals, advancing the reaction under stirring, and titrating the excessive di-n-butylamine with standard solution of hydrochloric acid). Upon addition of an active hydrogen-containing compound to such a copolymer of an alkylene oxide and an isocyanate compound having at least two isocyanate groups, the compound reacts with the isocyanate residue and is grafted to the copolymer. The formed graft copolymer is a novel polymer differing from heretofore known alkylene oxide polymers or copolymers.

As the active hydrogen-containing compound, for example, aliphatic or aromatic polymers containing at least one hydroxyl group, preferably polyether diol, polyester diol, polybutadiene diol, polyvinyl alcohol, etc., may be named. By the suitable selection of such active hydrogen-containing compound, the product copolymer can be modified in various ways. For example, a sulfur-vulcanizable copolymer can be formed by modification of the copolymer with polybutadiene diol.

The quantity of the active hydrogen-containing compound to be added is not critical. In certain cases, it may be dependent on the number of isocyanate residues in the copolymer. The addition of such compound may be effected during the progress, or after the completion, of the copolymerization reaction. It is also permissible to separate the copolymer from unreacted monomer or monomers, dissolve the copolymer in a suitable solvent (any solvent which is usable for the reaction), and add the active hydrogen-containing compound to the resulting solution. In such a practice, however, care must be taken to avoid contact of the copolymer with water or other undesirable active hydrogen-containing compound. If a gasified active hydrogen-containing compound is reacted with the copolymer, use of solvent is not essential.

The reaction of the copolymer with active hydrogen-containing compound may be performed over a broad temperature range, while that of 0–200° C. is preferred. The reaction may also be performed in the presence of a suitable catalyst.

Hereinafter the invention will be more specifically explained with reference to non-limitative examples. In all the examples the degree of polymerization of alkylene oxide polymers and alkylene oxide-isocyanate copolymers are expressed by reduced specific viscosity, $\eta sp./C$. The viscosities of ethylene oxide polymers, propylene oxide polymers, ethylene oxide-isocyanate copolymers and propylene oxide-isocyanate copolymers were determined as follows: 0.20 g. of such a polymer or copolymer was dissolved in 100 ml. of benzene, and the viscosity was measured at 30° C. As to epichlorohydrin polymers and the copolymers containing epichlorohydrin, 0.05 g. each of the sample dissolved in 50 ml. of cyclohexanone containing 0.5% to 2,2' - methylene - bis(4 - methyl - 6 - tertiary butyl phenol), and the viscosity was measured at 50° C.

The nitrogen analysis was performed only as to the copolymers of which nitrogen contents were presumed to be relatively high.

EXAMPLE 1

Ten (10) g. of dibutyltin oxide and 4.6 g. of phosphorus oxychloride were reacted for an hour at room temperature, in carbon tetrachloride. The reaction product was further reacted with 4.0 g. of n-butanol. Removing the solvent from the reaction product by distillation at elevated temperature and vacuum drying, a white solid was obtained. This solid was used as the catalyst for the polymerization of ethylene oxide in the presence of phenyl isocyanate.

0.10 gram of the catalyst weighed precisely was put in a 100-ml. capacity ampule, and after nitrogen-substitution of the atmosphere in the ampule, 40 ml. of benzene, 10 g. of ethylene oxide, and phenyl isocyanate of the quantity specified in Table 1 were charged thereinto. The polymerization was effected in a shaker-type thermostat, for 1.5 hours at 30° C. After the polymerization, the product in the ampule was poured into n-hexane, to remove unreacted monomers and solvent, and thereafter vacuum-dried for 24 hours at 50° C. Thus a white solid was obtained.

The yields and reduced specific viscosities of the polymers are shown in Table 1. As a control, similar data of the polymer produced in the absence of phenyl isocyanate are also given in Table 1.

Figure 1:
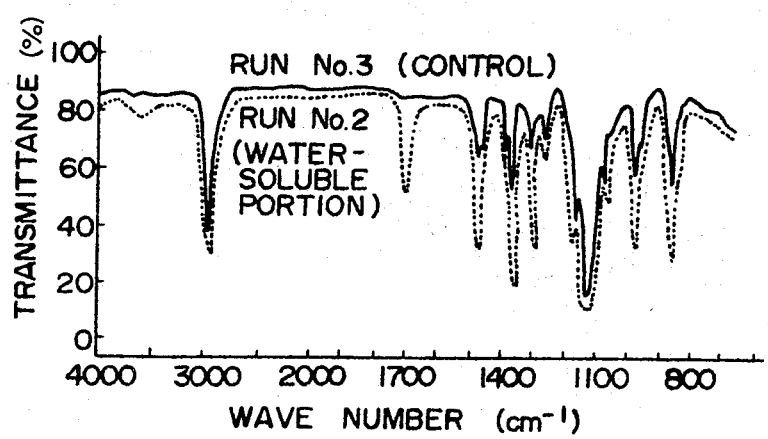
FIG. 1 is a graph showing the infrared adsorption curve of the water-soluble portion of the ethylene oxide-phenyl isocyanate copolymer produced of Run No. 2 of Example 1.

More than 95 wt. percent of the resulting ethylene oxide-phenyl isocyanate copolymers within the scope of this invention were water-soluble. The water-soluble portion comprises a random copolymer, different from the water-soluble portion of the alternate copolymer produced of the prior art, as proven by the acute absorption in the vicinity of 1700 cm.$^{-1}$ in the infrared absorption curve of FIG. 1.

TABLE 1

| | Phenyl Isocyanate (g.) | Yield (percent) | η Sp./C. | N-content (percent) |
|---|---|---|---|---|
| Run No.: | | | | |
| 1 | 0.5 | 22.5 | 45.2 | 0.31 |
| 2 | 3.0 | 13.7 | 50.5 | 1.32 |
| 3 (control) | 0 | 16.1 | 8.27 | 0.00 |

EXAMPLE 2

Figure 2:
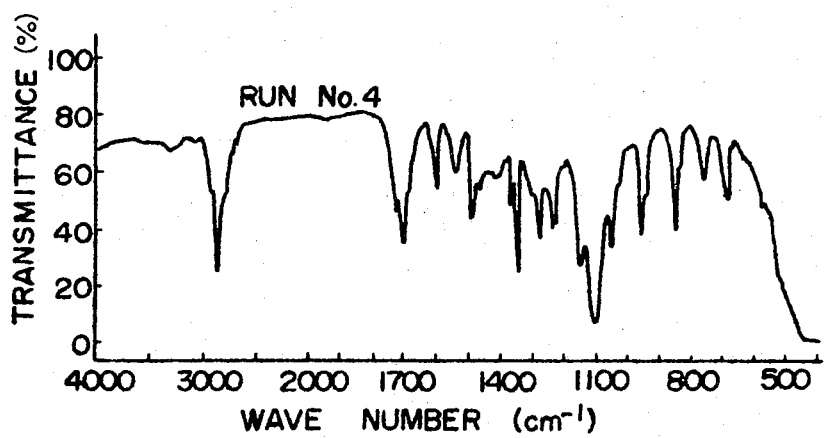
FIG. 2 is a graph showing the infrared absorption curve of the ethylene oxide-phenyl isocyanate copolymer produced of Run No. 4 of Example 2.

In the presence of 0.072 g. of the same catalyst as employed in Example 1, 8.0 g. of ethylene oxide dissolved in 40 ml. of benzene and 21.6 g. of phenyl isocyanate (mol ratio of ethylene oxide to phenyl isocyanate:1/1) were polymerized similarly to Example 1, for 69.5 hours at 30° C. Thus a white solid was obtained with a yield of 4.5%. The infrared absorption curve of this product is shown as FIG. 2 (Run No. 4). In this curve, the absorptions at 1490 cm.$^{-1}$ and 1590 cm.$^{-1}$ both prove the presence of phenyl radicals, and those at 1700 cm.$^{-1}$ and 1730 cm.$^{-1}$, the presence of urethane or acetal linkage. (We confirmed that the absorption at 1700 cm.$^{-1}$ is due to urethane linkage.) These results indicate that the solid is a copolymer.

Figure 3:
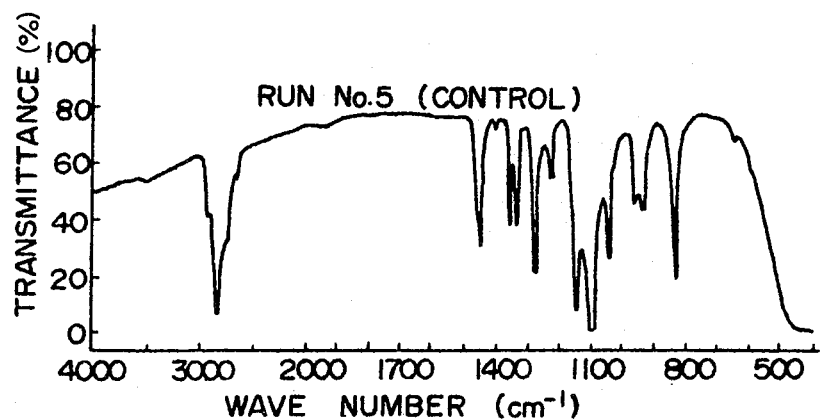
FIG. 3 is a graph showing the infrared absorption curve the ethylene oxide polymer of Run No. 5 of Example 2.

For comparison, the infrared absorption curve of the polymer similarly polymerized in the absence of phenyl isocyanate is shown in FIG. 3 (Run No. 5).

EXAMPLE 3

Using the catalyst prepared similarly to Example 1, propylene oxide was polymerized in the presence of ethyl isocyanate. 0.1 gram of the catalyst weighed precisely was put in a glass ampule of 30 ml. in capacity, and after nitrogen-substitution of the air in the ampule, 20 ml. of propylene oxide and ethyl isocyanate of the quantity specified in Table 2 were charged into the vessel. The polymerization was effected in a shaker-type thermostat for 3 hours at 30° C. After the polymerization, unreacted monomers were removed from the reaction product by freeze-drying, and a white, rubbery solid was obtained. The yields and reduced specific viscosities of the formed polymers are shown in Table 2. As a control, similar data as to the polymer produced of the system lacking the isocyanate are given concurrently.

TABLE 2

| | Ethyl isocyanate (g.) | Yield (percent) | η Sp./C. | N content (percent) |
|---|---|---|---|---|
| Run No.: | | | | |
| 6 | 0.05 | 14.5 | 21.4 | 0.35 |
| 7 | 0.50 | 11.7 | 25.5 | 2.11 |
| 8 (control) | 0 | 9.5 | 4.42 | 0 |

EXAMPLE 4

Epichlorohydrin and ethylene oxide were copolymerized in the presence of 2,4-tolylene diisocyanae, using the catalyst prepared in the manner described in Example 1. 0.30 gram of the catalyst was weighed and put into a 100-ml. capacity glass ampule, and after nitrogen-substituting the inside atmosphere of the ampule, 1.5 g. of epichlorohydrin, 5.5 g. of ethylene oxide, and 2,4-tolylene diisocyanate of the quantity specified in Table 3 were added thereinto. After 10 hours' polymerization at 30° C., the reaction product was poured into n-hexane to remove the unreacted monomers. Upon vacuum-drying the remaining product, a rubbery, white solid was obtained. The yields and reduced specific viscosities of the formed polymers are shown in Table 3. When the quantity of 2,4-tolylene diisocyanate was increased, the resulting copolymers became insoluble in cyclohexanone. For comparison, similar data of the product from the polymerization system containing no 2,4-tolylene diisocyanate are given concurrently.

TABLE 3

| | 2,4-tolylene diisocyanate (g.) | Yield (percent) | η Sp./C. | N content (percent) |
|---|---|---|---|---|
| Run No.: | | | | |
| 9 | 0.05 | 9.5 | 1.44 | -------- |
| 10 | 1.0 | 8.1 | 1.90 | 0.26 |
| 11 | 2.5 | 6.9 | Insoluble | 0.59 |
| 12 (control) | 0 | 7.0 | 0.57 | 0.00 |

EXAMPLE 5

Ternary copolymerization of epichlorohydrin, ethylene oxide, and 2,4-tolylene diisocyanate was performed to examine the correlation between yield and polymer composition, using the catalyst prepared similarly to Example 1. The copolymerization was performed similarly to Example 4, using 0.50 g. of the catalyst, 51.5 g. of epichlorohydrin, 5.5 g. of ethylene oxide, and 2.9 g. of 2,4-tolylene diisocyante, at 30° C., for 9, 15, and 26 hours. The copolymers were in all cases tough, rubbery solids. The yields and elementary analysis results of the formed polymers are shown in Table 4. With the longer polymerization time, the yield increased, and in direct proportion to the yield increase, the copolymerized isocyanate content also increased.

TABLE 4

| | Polymerization time (hr.) | Yield (percent) | Elementary analysis values | |
|---|---|---|---|---|
| | | | N (percent) | Cl (percent) |
| Run No.: | | | | |
| 13 | 9 | 9.9 | 0.61 | 29.05 |
| 14 | 15 | 16.0 | 1.06 | 30.05 |
| 15 | 26 | 24.0 | 1.49 | 28.82 |

EXAMPLE 6

Ternary copolymerization of epichlorohydrin, ethylene oxide, and 2,4-tolylene diisocyanate was performed with the quantity of the diisocyanate drastically varied in each run, using the catalyst prepared similarly to Example 1, and the produced copolymers were subjected to elementary analysis. The copolymerization was performed similarly to Example 4, using 0.20 g. of the catalyst, at 30° C. for various durations of time. The correlation between the monomeric composition and the copolymer composition is shown in Table 5. In all runs the quantitative ratio between epichlorohydrin and ethylene oxide in the monomeric composition was 90:5:9.5 (by weight). With the increase in the quantity of 2,4-tolylene diisocyanate, the copolymer changed from a rubbery state to an extremely tough resinous composition.

TABLE 5

| | Monomers | | | | Polymer | |
|---|---|---|---|---|---|---|
| | Epichlorohydrin (g.) | Ethylene oxide (g.) | 2,4-tolylene diisocyanate (g.) | Polymerization time (hr.) | Yield (percent) | N (percent) | Cl (percent) |
| Run No.: | | | | | | | |
| 16 | 16.9 | 1.8 | 4.8 | 6 | 4.7 | 1.80 | 17.33 |
| 17 | 11.2 | 1.2 | 11.0 | 9 | 4.1 | 2.14 | 18.02 |
| 18 | 6.9 | 0.7 | 15.9 | 13 | 5.1 | 3.73 | 18.42 |
| 19 | 2.3 | 0.2 | 21.3 | 61 | 5.5 | 5.84 | 21.84 |

EXAMPLE 7

64.1 grams of dibutyltin dilaurate, 5.6 g. of commercial phosphoric acid, and 10 g. of water were mixed, and heated at 130° C. for 60 minutes while distiling the water off. Thereafter the system was further heated at 260° C. for 30 minutes, and a boron solid was obtained. 0.09 gram of the solid was used as the catalyst for polymerization of ethylene oxide in the presence of hexamethylene diisocyanate of the quantity varied in each run as specified in Table 6. The copolymerization was performed similarly to Example 1, at 30° C. for 21 hours. The yields and reduced specific viscosities of the produced copolymers are shown in Table 6. For a comparison, a similar data of the run performed in the absence of hexamethylene diisocyanate are given concurrently.

TABLE 6

| | Hexamethylene diisocyanate (g.) | Yield (percent) | η Sp./C. | N content (percent) |
|---|---|---|---|---|
| Run No.: | | | | |
| 20 | 0.01 | 11.0 | 59.0 | |
| 21 | 0.10 | 8.7 | Insoluble | |
| 22 | 1.0 | 7.5 | Insoluble | 0.45 |
| 23 (control) | 0 | 3.5 | 10.5 | |

EXAMPLE 8

32.9 grams of dibutyltin dilaurate were mixed with 2.0 g. of metaphosphoric acid, and the mixture was heated at 260° C. for 30 minutes to produce a brown, solid reaction product. Ethylene oxide was polymerized in the presence of phenyl isocyanate at 30° C. for 45 hours, in the manner similar to Example 1, using 0.09 g. of above solid product as the catalyst. The results were as shown in Table 7 below. For comparison, the results of the run performed in the absence of phenyl isocyanate are given concurrently.

TABLE 7

| | Phenyl isocyanate (g.) | Yield (percent) | η Sp./C. |
|---|---|---|---|
| Run No.: | | | |
| 24 | 0.01 | 2.2 | 10.6 |
| 25 | 0.10 | 3.6 | 11.2 |
| 26 (control) | 0 | Trace | |

EXAMPLE 9

In 100 ml. of p-xylene, 13.4 of dibutyltin oxide and 5.3 g. of orthophosphoric acid were reacted at 138° C. for 2 hours. Removing the solvent from the system, a solid reaction product was obtained. Ethylene oxide was polymerized in the presence of 2,4-tolylene diisocyanate, at 60° C. for 20 hours, in the manner similar to Example 1, using 0.09 g. of the above solid product as the catalyst. The results were as shown in Table 8 below. For comparison, the results of the run performed in the absence of 2,4-tolyene diisocyanate are also given in the same table.

TABLE 8

| | 2,4-tolylene diisocyanate (g.) | Yield percent | η SP./C. |
|---|---|---|---|
| Run No.: | | | |
| 27 | 0.05 | 14.7 | 30.2 |
| 28 | 0.10 | 16.1 | 31.5 |
| 29 (control) | 0 | 33.4 | 5.32 |

EXAMPLE 10

0.96 gram of ortho-phosphoric acid was weighed and put in a 100-ml. capacity glass ampule. After nitrogen-substitution of the inside atmosphere of the ampule, 15 ml. of ethyl ether were added thereinto to disperse the ortho-phosphoric acid. The dispersion was reacted with 15 ml. of a benzene solution of triisobutyl aluminum (1 mol/liter) in the ampule, and the system was further diluted with benzene to the total quantity of 70 ml., followed by an hour's aging at room temperature. The catalyst was used in the copolymerization of epichlorohydrin with 2,4-tolylene diisocyanate.

Into a 100-ml. capacity ampule filled with nitrogen, 33 g. of benzene, 1.4 g. of epichlorohydrin 2,4-tolylene diisocyanate of the quantity specified in Table 9, and 1.12 ml. of the above catalyst were charged, and polymerized at 30° C. for 18 hours. The yields, reduced specific viscosities and nitrogen contents of the resulting copolymers are shown in Table 9. For comparison, the results of the run performed in the absence of 2,4-tolylene diisocyanate are also given in the same table.

TABLE 9

| | 2,4-tolylene diisocyanate (g.) | Yield (percent) | η Sp./C. | N content (percent) |
|---|---|---|---|---|
| Run No.: | | | | |
| 30 | 0.15 | 15.7 | 6.04 | |
| 31 | 0.72 | 12.2 | 5.60 | 0.90 |
| 32 | 5.0 | 8.5 | Insoluble | 2.15 |
| 33 (control) | 0 | 9.7 | 8.39 | 0.00 |

EXAMPLE 11

5.0 grams of tin tetrachloride were dispersed in 20 ml. of carbon tetrachloride in nitrogen atmosphere, and 1.77 g. of phosphorus oxychloride was added and reacted. Thereafter 1.62 g. of m-butanol was added to the system. Removing the solvent by distillation at 150° C. for an hour and vacuum drying, a solid reaction product was obtained. Using 0.15 g. of the solid product as the catalyst, 10 g. of ethylene oxide and 0.5 g. of phenyl isocyanate were copolymerized similarly to Example 1, at 30° C. for 20 hours (Run No. 34). The yield of the copolymer was 7.2%, reduced specific viscosity was 5.0, and the nitrogen content was 0.99%.

EXAMPLE 12

5.0 grams of tin tetrachloride were dispersed in 20 ml. of carbon tetrachloride in nitrogen current, and to the dispersion 2.95 g. of phosphorus oxychloride were added and reacted for an hour at room temperature. Thereafter 7.1 g. of n-butanol were added to the system, followed by further 2 hours reaction. Removing the solvent by distillation at 150° C., and vacuum drying, a brown solid was obtained. Using 0.05 g. of the solid product as the catalyst, ethylene oxide and 2,4-tolylene diisocyanate were copolymerized similarly to Example 1, at 30° C. for 3 hours. The results were as given in Table 10. For comparison, the results of the run performed in the absence of the isocyanate compound are also given in the same table.

TABLE 10

| Run No.: | 2,4-tolylene diisocyanate (g.) | Yield (percent) | η Sp./C. |
|---|---|---|---|
| 35 | 0.12 | 4.10 | 5.50 |
| 36 | 1.2 | 3.00 | Insoluble |
| 37 (control) | 0 | 2.65 | 0.70 |

EXAMPLE 13

Ten (10) g. of dibutyltin oxide were dispersed in 30 ml. of carbon tetrachloride in nitrogen current, and to the dispersion 6.16 g. of phosphorus oxychloride and 15 g. of n-butanol were added, followed by an hour's standing to allow the reaction. Removing the solvent by distillation at an elevated temperature and vacuum drying, a solid reaction product was obtained. Using this solid as the catalyst, ethylene oxide, propylene oxide, and epichlorohydrin were each copolymerized with 2,4-tolylene diisocyanate, under the respective conditions as given in Tables 11, 12, and 13. The results are given in the same tables.

TABLE 11

Ethylene oxide, 5.3 g.
Benzene, 24 ml.
Catalyst, 0.026 g.
Polymerization conditions, 30° C.×1.75 hours

| Run No.: | 2,4-tolylene diisocyanate (g.) | Yield (percent) | η Sp/C |
|---|---|---|---|
| 38 (Control) | 0 | 37.2 | 4.60 |
| 39 | 0.05 | 46.7 | Insoluble |
| 40 | 0.16 | 55.5 | Insoluble |

TABLE 12

Propylene oxide, 17.5 g.
Catalyst, 0.17 g.
Polymerization conditions, 30° C.×1 hour

| Run No.: | 2,5-tolylene diisocyanate (g.) | Yield (percent) | η Sp./C. |
|---|---|---|---|
| 41 (control) | 0 | 13.8 | 2.41 |
| 42 | 0.09 | 22.2 | 24.4 |
| 43 | 0.17 | 23.9 | 26.2 |

TABLE 13

Epichlorohydrin, 35.5 grams
Catalyst, 0.18 grams
Polymerization conditions, 30° C.×6 hours

| Run No.: | 2,5-tolylene diisocyanate (g.) | Yield (percent) | η Sp./C. |
|---|---|---|---|
| 44 (control) | 0 | 15.9 | 2.18 |
| 45 | 0.18 | 17.4 | 3.48 |
| 46 | 0.36 | 15.6 | 3.48 |

EXAMPLE 14

Using the catalysts prepared in Examples 1, 7, 8, 9, 10, and 13, alkylene oxides were polymerized in the presence of isocyanate compounds, as specified in Table 14, in the manner similar to Example 1. The yields, reduced specific viscosities and N-contents determined by elementary analysis, of the formed copolymers are shown in Table 15.

TABLE 14

| Run No.: | Catalyst Type | Catalyst Quantity (g.) | Alkylene oxide Type | Alkylene oxide Quantity (g.) | Isocyanate | Polymerization conditions (° C.×hours) |
|---|---|---|---|---|---|---|
| 47–49 | Example 1 | 0.1 | Epichlorohydrin / Ethylene oxide | 51.5 / 5.5 | Hexamethylene diisocyanate. | 30×3 |
| 50–51 | Example 7 | 0.12 | Epichlorohydrin / Ethylene oxide | 51.5 / 5.5 | n-Butyl isocyanate. | 30×30 |
| 52–54 | Example 8 | 0.6 | Epichlorohydrin | 59 | Tolylene diisocyanate. | 60×20 |
| 55–57 | Example 9 | 0.5 | Propylene oxide | 17 | Ethyl isocyanate | 30×30 |
| 58–60 | Example 10 | (1) | Ethylene oxide | 10 | Phenyl isocyanate. | 30×15 |
| 61–66 | Example 13 | 0.1 | Epichlorohydrin / Ethylene oxide | 51.5 / 5.5 | ....do............ | 30×2.5 |

1 1 ml.

TABLE 15

| Run No.: | Isocyanate (g.) | Yield (percent) | Reduced specific viscosity (η sp./C.) | N content (percent) |
|---|---|---|---|---|
| 47 (control) | 0 | 7.5 | 1.50 | |
| 48 | 0.06 | 10.2 | 4.00 | |
| 49 | 0.60 | 8.7 | 4.84 | 0.69 |
| 50 (control) | 0 | 9.9 | 1.72 | |
| 51 | 0.09 | 11.4 | 4.53 | |
| 52 (control) | 0 | 8.8 | 1.98 | |
| 53 | 0.12 | 14.5 | 3.44 | |
| 54 | 1.2 | 15.0 | 2.94 | |
| 55 (control) | 0 | 9.5 | 3.15 | |
| 56 | 0.04 | 14.5 | 7.86 | |
| 57 | 0.44 | 11.7 | 8.10 | 2.11 |
| 58 (control) | 0 | 18.1 | 4.83 | |
| 59 | 0.05 | 72.0 | 39.4 | |
| 60 | 0.50 | 72.1 | Insoluble | 0.49 |
| 61 (control) | 0 | 5.6 | 1.45 | |
| 62 | 0.06 | 10.5 | 4.43 | |
| 63 | 0.12 | 11.0 | 4.21 | |
| 64 | 0.30 | 11.1 | 4.57 | |
| 65 | 0.60 | 10.1 | 4.80 | |
| 66 | 1.20 | 10.3 | 4.15 | |

EXAMPLE 15

A solution formed by dispersing 1.47 g. of ortho-phosphoric acid in 25.5 ml. of ether was reacted with another solution formed by dissolving 5.1 g. of aluminum isopropoxide in 40 ml. of n-hexane, at room temperature. Using 1.5 ml. of the reaction liquid as the catalyst, ethylene oxide was polymerized at 30° C. for 4 hours in the presence of hexamethylene diisocyanate, similarly to Example 1. The yields and reduced specific viscosities of the resulting copolymers are shown in Table 16. For comparison, the results of the run performed in the absence of hexamethylene diisocyanate are also given in the same table.

TABLE 16

| | Hexamethylene diisocyanate (g.) | Yield (percent) | $\eta$ Sp./C. | N content (percent) |
|---|---|---|---|---|
| Run No.: | | | | |
| 67 | 0.1 | 4.86 | 14.5 | |
| 68 | 2.0 | 2.99 | 14.7 | 2.62 |
| 69 (control) | 0 | 2.17 | 0.8 | 0 |

EXAMPLE 16

3.1 grams of anhydrous aluminum chloride, 3.5 g. of phosphorus oxychloride, and 8.5 g. of n-butanol were reacted in 15 ml. of carbon tetrachloride. After the reaction the solvent was distilled off by heating, leaving a brown solid. Using 0.30 g. of this solid product as the catalyst, epichlorohydrin was polymerized in the presence of 2,4-tolylene diisocyanate, under the conditions as specified in Table 17. The yields and reduced specific viscosities of the formed copolymers are shown in Table 17. For comparison, the results of the run performed in the absence of isocyanate are given concurrently.

TABLE 17

Epichlorohydrin, 59 grams.
Catalyst, 0.3 grams.
Polymerization conditions, 30° C.×21 hours.

| | 2,4-tolylene diisocyanate (g.) | Yield (percent) | $\eta$ Sp./C. | N content (percent) |
|---|---|---|---|---|
| Run No.: | | | | |
| 70 | 0.5 | 2.2 | 2.6 | |
| 71 | 2.5 | 2.8 | 2.8 | 3.15 |
| 22 (control) | 0 | 0.8 | 0.4 | 0 |

EXAMPLE 17

In 20 ml. of carbon tetrachloride, 11.6 g. of zirconium chloride and 7.7 g. of phosphorus oxychloride were added and stirred thoroughly. Then 23 ml. of n-butanol were gradually added to the system while the reaction was under progress. After the reaction, the solvent was distilled off under heating, leaving a brown solid. Using 0.050 g. of the solid as the catalyst, ethylene oxide was polymerized in the presence of phenyl isocyanate at 30° C. for 2 hours, in the manner similar to Example 1. The yields and reduced specific viscosities of the formed copolymers are shown in Table 18. For comparison, the results of the run performed in the absence of phenyl isocyanate are also given in the same table.

TABLE 18

| | Phenyl isocyanate (g.) | Yield (percent) | $\eta$ Sp./C. | N content (percent) |
|---|---|---|---|---|
| Run No.: | | | | |
| 73 | 0.1 | 17.1 | 20.8 | |
| 74 | 2.2 | 8.6 | 12.9 | 3.86 |
| 75 (control) | 0 | 12.0 | 1.0 | 0 |

EXAMPLE 18

Epichlorohydrin was polymerized in the presence of phenyl isocyanate, using the catalyst prepared as described in Example 17. Epichlorohydrin and phenyl isocyanate of the quantities specified in Table 19, and 0.10 g. of the catalyst were charged in an ampule, and the reactants were polymerized at 30° C. for 4 hours. The yields and reduced specific viscosities of the formed copolymers are shown in Table 19. For comparison, the results of the run performed in the absence of phenyl isocyanate are also given in Table 19.

TABLE 19

| | Epichlorohydrin (g.) | Phenyl isocyanate (g.) | Yield (percent) | $\eta$ Sp./C. | N content (percent) |
|---|---|---|---|---|---|
| Run No.: | | | | | |
| 76 | 59 | 0.1 | 10.3 | 2.8 | |
| 77 | 35 | 11 | 4.6 | 2.3 | 1.20 |
| 78 (control) | 59 | 0 | 5.2 | 1.1 | 0 |

EXAMPLE 19

Equimolar quantities of zirconium oxychloride and diammonium phosphate were reacted in aqueous phase, and the formed white precipitate was allowed to stand overnight, filtered, and washed thoroughly with water. The obtained was dried for a day and night at 50° C., ground, and sintered at 500° C. for 5 hours.

Using 0.26 g. of so prepared catalyst, ethylene oxide was polymerized in the presence of phenyl isocyanate, in the manner similar to Example 1, at 80° C. for 45 hours. The yields and reduced specific viscosities of the formed copolymers were as shown in Table 20. For comparison, the results of the run performed in the absence of phenyl isocyanate are also given in the same table.

TABLE 20

| | Phenyl isocyanate (g.) | Yield (percent) | $\eta$ Sp./C. | N content (percent) |
|---|---|---|---|---|
| Run No.: | | | | |
| 79 | 0.3 | 31.3 | 2.0 | |
| 80 | 0.5 | 32.4 | 2.4 | 1.04 |
| 81 (control) | 0 | 32.2 | 0.3 | 0 |

EXAMPLE 20

5.16 grams of tetraphenyllead and 1.96 g. of ortho-phosphoric acid were reacted in 10 ml. of toluene at 100° C. for 30 minutes, with thorough stirring. After the reaction the system was further heated to distill off the solvent, and a brown solid was obtained. Using 0.30 g. of the reaction product as the catalyst, ethylene oxide was polymerized in the presence of phenyl isocyanate, in the manner similar to Example 1, at 30° C. for 94 hours. The yields and reduced specific viscosities of the formed copolymers were as given in Table 21 below. For comparison, the results of the run performed in the absence of phenyl isocyanate are given concurrently.

TABLE 21

| | Phenyl isocyanate (g.) | Yield (percent) | $\eta$ Sp./C. | N content (percent) |
|---|---|---|---|---|
| Run No.: | | | | |
| 82 | 0.1 | 0.8 | | |
| 83 | 2.2 | 2.7 | 3.0 | 0.95 |
| 84 (control) | 0 | Trace | | |

EXAMPLE 21

6.2 grams of boric acid were added to 9.8 g. of ortho-phosphoric acid, mixed thoroughly, and heated at 260° C. for an hour. Using 0.50 g. of the solid reaction product as the catalyst, ethylene oxide was polymerized at 60° C. for 23 hours, in the presence of phenyl isocyanate, in the manner similar to Example 1. The yields and reduced specific viscosities of the formed copolymers were as shown in Table 22. For comparison, the results of the run performed in the absence of phenyl isocyanate are given concurrently.

TABLE 22

| | Phenyl isocyanate (g.) | Yield (percent) | η Sp./C. |
|---|---|---|---|
| Run No.: | | | |
| 85 | 0.1 | 4.9 | 1.3 |
| 86 | 0.3 | 20.0 | 2.8 |
| 87 (control) | 0 | 1.5 | 0.25 |

EXAMPLE 22

5.2 grams of trimethylboron and 4.9 g. of ortho-phosphoric acid were mixed in carbon tetracholride, and heated under stirring.

Thereafter the solvent was distilled off, leaving a waxy, white solid. Using 0.2 g. of the solid product as the catalyst, ethylene oxide was copolymerized with phenyl isocyanate under the conditions given in Table 23 below, in the manner similar to Example 1. The yield and reduced specific viscosity of the formed copolymer, ae shown in Table 23. For comparison, the results of the run performed in the absence of phenyl isocyanate are also shown.

TABLE 23

Ethylene oxide, 10 g.
Benzene, 40 ml.
Polymerization conditions 60° C.×65 hours

| | Phenyl isocyanate (g.) | Yield (percent) | η Sp./C. | N-content (percent) |
|---|---|---|---|---|
| Run No.: | | | | |
| 88 | 2.2 | 8.2 | 3.5 | 2.87 |
| 89 (control) | 0 | 0 | | |

EXAMPLE 23

10.4 grams of ethyl orthosilicate were mixed with 13.3 g. of tributyl phosphate, and reacted at 260° C. for an hour to produce a viscous, liquid product. Using 0.50 g. of the reaction product as the catalyst, ethylene oxide was polymerized at 60° C. for 23 hours in the presence of phenyl isocyanate, in the manner similar to Example 1. The yields and reduced specific viscosities of the formed copolymers are shown in Table 24. For comparison, the results of the run performed in the absence of phenyl isocyanate are also shown in the same table.

TABLE 24

| | Phenyl isocyanate (g.) | Yield (percent) | η Sp./C. |
|---|---|---|---|
| Run No.: | | | |
| 90 | 0.1 | 2.1 | 6.1 |
| 91 | 0.3 | 2.7 | 5.1 |
| 92 (control) | 0 | 2.0 | 1.3 |

EXAMPLE 24

10.4 grams of ethyl orthosilicate and 4.9 g. of ortho-phosphoric acid were mixed and heated at 260° C. for an hour, producing a white solid. Using 0.50 g. of the solid product as the catalyst, ethylene oxide was polymerized at 60° C. for 23 hours, in the presence of phenyl isocyanate, in the manner similar to Example 1. The yields and reduced specific viscosities of the formed copolymers are given in Table 25. For comparison, the results of the run performed in the absence of phenyl isocyanate are given in the same table.

TABLE 25

| | Phenyl isocyanate (g.) | Yield (percent) | η Sp./C. |
|---|---|---|---|
| Run No.: | | | |
| 93 | 0.10 | 18.6 | 1.2 |
| 94 | 0.30 | 21.5 | 1.8 |
| 95 (control) | 0 | 5.7 | 0.3 |

EXAMPLE 25

A white solid was obtained by heating 11.3 g. of titanium tetrabutoxide with 6.5 g. of ortho-phosphoric acid at 200° C. for 30 minutes.

Using 0.4 g. of the solid reaction product as the catalyst, ethylene oxide was polymerized at 30° C. for 65 hours, in the presence of 2,4-tolylene diisocyanate, in the manner similar to Example 1. The yields and reduced specific viscosities of the formed copolymers were as given in Table 26. For comparison, the results of the run performed in the absence of isocyanate are also given.

TABLE 26

| | 2,4-tolylene diisocyanate (g.) | Yield (percent) | η Sp./C. | N content (percent) |
|---|---|---|---|---|
| Run No.: | | | | |
| 96 | 0.3 | 12.6 | 3.9 | |
| 97 | 0.5 | 16.3 | 9.0 | 1.87 |
| 98 (control) | 0 | 5.4 | 0.3 | 0 |

EXAMPLE 26

Ten (10) g. of dibutyltin oxide and 4.6 g. of phosphorus oxichloride were reacted at room temperature in carbon tetrachloride. Then 8.0 g. of n-butanol were further added to the system to react with the reaction product. The reaction mixture was heated to remove the solvent by distillation. Vacuum drying the remaining system, a white solid was obtained.

Into a 800-ml. capacity glass container, 0.33 g. of the above solid was charged as the catalyst, and the air in the container was substituted with nitrogen. Then 59.5 g. of epichlorohydrin, 6.1 g. of ethylene oxide, 3.28 g. of 2,4-tolylene diisocyanate, and 255 g. of benzene were added into the container, followed by 20 hours polymerization at 30° C.

Thereafter 65.6 g. of polybutadiene diol were added to the reaction mixture, and reacted for further 20 hours at 30° C. From the reaction product, unreacted monomers, reaction product of 2,4-tolylene diisocyanate with polybutadiene diol, and the solvent were removed by treating the system with a large amount of petroleum ether. Thus 16.6 g. of a white, rubbery copolymer were obtained.

The copolymer was blended with other components in accordance with the recipe below, and kneaded at 30–40° C. for approximately 30 minutes with a 1-inch roll.

| Component: | Parts by weight |
|---|---|
| The copolymer | 100 |
| Tin stearate | 2 |
| FEF carbon black | 40 |
| Sulfur | 1.5 |
| Tetramethylthiuram sulfide | 2 |
| Zinc flower | 5 |
| Benzothiazyl disulfide | 1 |

Figure 4:
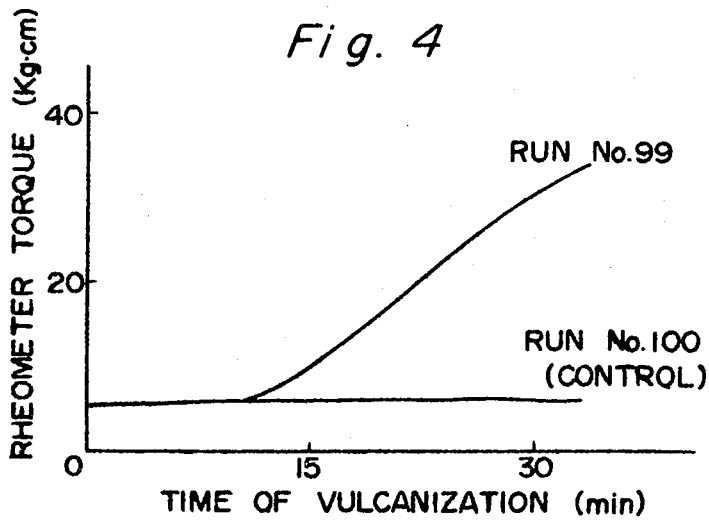
FIG. 4 is a graph vulcanization curve of an epichlorohydrin-ethylene oxide-2,4-tolylene diisocyanate copolymer, measured with an oscillating disk rheometer.

The vulcanization characteristic of the resulting kneaded blend was measured at 155° C. with an oscillating disk rheometer which is designed to measure the value of the torque given to a double-conical rotor when it is oscillated at 3 rotations per minute, with an angle of 3°. The value of the torque is corellative with the vulcanization degree. The result is plotted on FIG. 4 (Run No. 99). For comparison, the result of an experiment similar to the above except that the reaction with polybutadiene diol was omitted is also shown on FIG. 4 (Run No. 100).

From the outcome of the present example, it can be understood that the alkylene oxide-diisocyanate copolymer in accordance with the invention provides sulfur-vulcanizable rubber, upon modification with active hydrogen-containing compound such as polybutadiene diol.

We claim:
1. A process for the preparation of alkylene oxide-isocyanate copolymers, which comprises polymerizing at least one alkylene oxide in the presence of at least one isocyanate in the presence of a catalyst formed of at least one compound containing phosphorus-oxygen linkage and at least one compound of a metal of Group III or IV of the Periodic Table.

2. The process of claim 1, wherein said compound containing phosphorus-oxygen linkage is phosphoric acid.

3. The process of claim 1, wherein said compound containing phosphorus-oxygen linkage is an organic ester of phosphoric acid.

4. The process of claim 1, wherein said metal of Group III or IV is tin.

5. The process of claim 1, wherein said metal of Group III or IV is zirconium.

6. The process of claim 1, wherein said metal of Group III or IV is aluminum.

7. The process of claim 1, wherein said alkylene oxide is epichlorohydrin.

8. The process of claim 1, wherein said alkylene oxide is a mixture of epichlorohydrin and ethylene oxide.

9. A process for the preparation of alkylene oxide-isocyanate copolymers, which comprises polymerizing at least one alkylene oxide in the presence of at least one isocyanate in the presence of a catalyst formed of phosphorus oxychloride, at least one compound of a metal of Group III or IV of the Periodic Table, and an alcohol.

10. A process for the preparation of copolymers of an alkylene oxide and an isocyanate having at least two isocyanate groups, said copolymers being modifiable with an active hydrogen-containing compound, which comprises polymerizing at least one alkylene oxide in the presence of at least one isocyanate having at least two isocyanate groups, in the presence of a catalyst formed of at least one compound containing phosphorus-oxygen linkage, and at least one compound of a metal of Group III or IV of the Periodic Table and reacting the copolymer formed with an active hydrogen-containing compound.

11. The process of claim 10, wherein said active hydrogen-containing compound is polybutadiene diol.

References Cited

UNITED STATES PATENTS 3,242,108   3/1966   McGary et al. _____ 260—858

OTHER REFERENCES

Furukawa et al.: Makromal. Chem. 85, 1965, pp. 80–90.

DONALD E. CZAJA, Primary Examiner

M. J. WELSH, Assistant Examiner